April 16, 1935.  J. TELLER ET AL  1,998,343
COOKING RANGE AND STOVE
Filed Dec. 17, 1931  2 Sheets-Sheet 1

INVENTORS:
Jacob Teller,
Arthur P. Schulz,
BY
ATTORNEY.

April 16, 1935.　　　J. TELLER ET AL　　　1,998,343
COOKING RANGE AND STOVE
Filed Dec. 17, 1931　　　2 Sheets-Sheet 2

INVENTORS:
Jacob Teller,
BY Arthur P. Schulz,
ATTORNEY.

Patented Apr. 16, 1935

1,998,343

UNITED STATES PATENT OFFICE 1,998,343

COOKING RANGE AND STOVE

Jacob Teller, New Rochelle, and Arthur P. Schulz, New York, N. Y., assignors to Teller Stove Designing Corporation, New York, N. Y., a corporation of New York Application December 17, 1931, Serial No. 581,760

4 Claims. (Cl. 126—339)

This invention relates to cooking ranges and stoves, and particularly to the oven construction and the rack arrangement which supports the food or cooking vessels within the oven.

One of the objects of the present invention is the provision of an oven rack which may be moved by sliding into and out of the oven, whereby the material upon the rack or racks is more readily accessible, avoiding the necessity of the operator reaching into the oven in order to load or remove the food containers, it being well known that persons have very often burned themselves or their clothing by contact with hot oven walls or other parts thereof.

Another great advantage is that the mounting of the rack permits easier and more ready inspection of the material being cooked in the oven, since it is necessary only for the operator to give a slight pull on an operating hand piece or pull member, to bring the entire rack out of the oven for convenient access of the person using the range.

Another feature resides in a sliding rack carrier in which provision is made for supporting or carrying simultaneously, and moving as a unit, a plurality of utensil racks, whereby individual actuation of the several racks is unnecessary.

Another feature resides in the particular mounting of the rack carrier upon anti-friction devices, whereby the entire carrier and racks thereon is easily slidable into and out of the oven.

Another feature resides in the peculiar arrangement of the rack mounting, whereby the racks may individually be readily placed or removed from said carrier, by a simple tilting movement of any rack, and whereby said racks, when placed in position are securely held by their own weight against any accidental displacement.

Many other features and advantages will appear to stove and range manufacturers and to others familiar with the operation of the same, particularly the housewife or cook.

In the accompanying drawings, forming a part of this specification,

Figure 1:
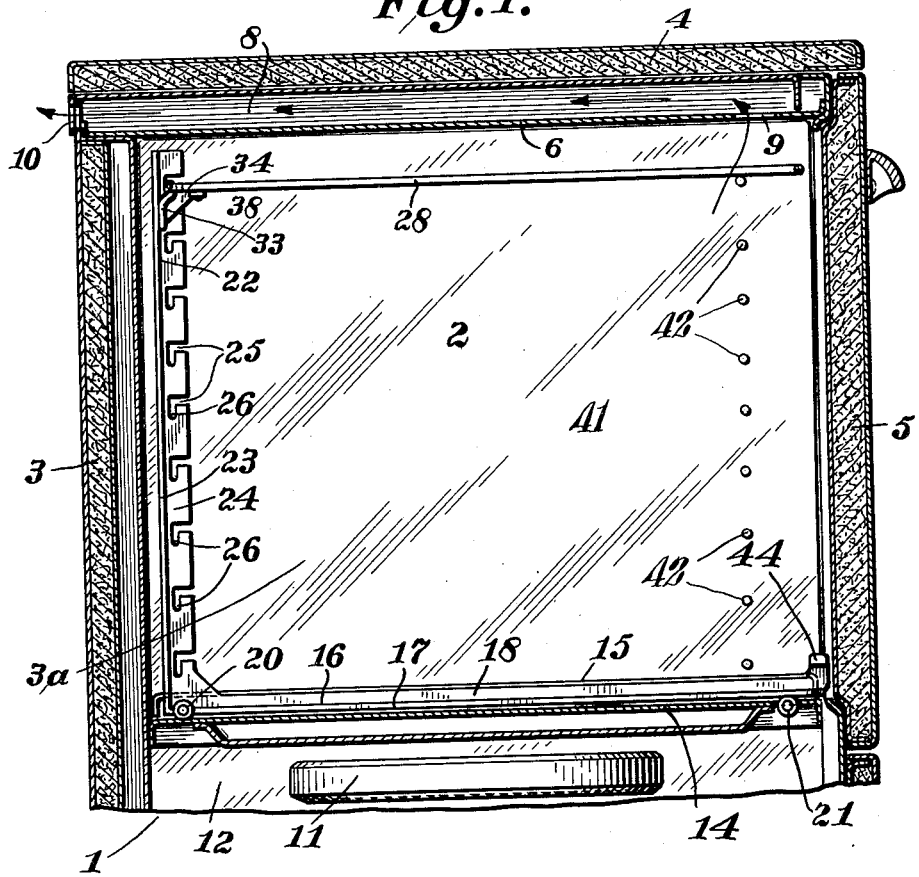
Fig. 1 is a vertical sectional view of an oven and showing the application of our improvement thereto.

Referring now to the drawings by numerals of reference, 1 indicates a gas stove or range, having an upper oven compartment 2 with insulated rear and side walls 3, and 3a, an insulated top 4, and an insulated front swinging door 5, the construction of which may be of any preferred conventional form, the oven 2 at the top however, being provided with a false inner top 6, spaced a suitable distance from the inner plate of the insulated top, to provide a channel or duct 8, through which the fumes produced by cooking may be conveyed from the oven through a forward port 9, and out to the atmosphere or chimney by means of a ventilator 10 arranged in the rear wall 3, as shown.

By arranging the port 9 toward the front of the false top, the heat is caused to travel the depth of the oven before escaping to the atmosphere, thereby utilizing the maximum heating capacity of the heat produced by the burner 11, arranged in the lower broiler compartment 12 below the floor 14 which separates the upper and lower compartments.

Figure 3:
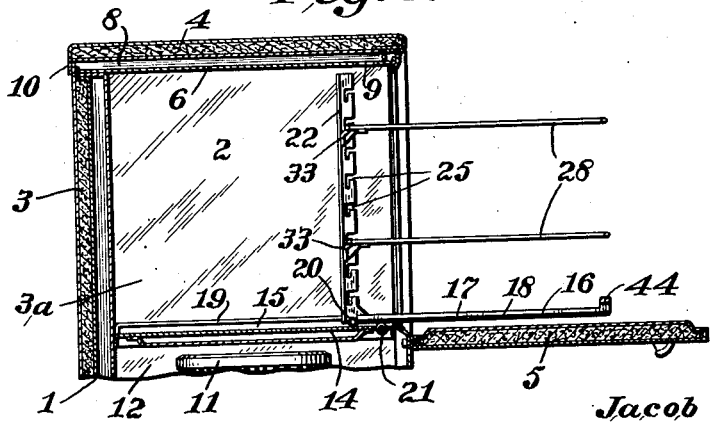
Figure 3 is a view similar to Fig. 1, but showing the rack carrier extended to permit access to the material on the racks.

Since the predominating feature of our present invention resides in a mechanism for supporting the racks in the oven in a manner that that which is supported thereby may more readily be accessible to the operator using the range, we have provided the novel arrangement, shown more specifically in detail in Figure 3, wherein only those elements are illustrated, which are necessary for the operation of the apparatus.

Figure 2:
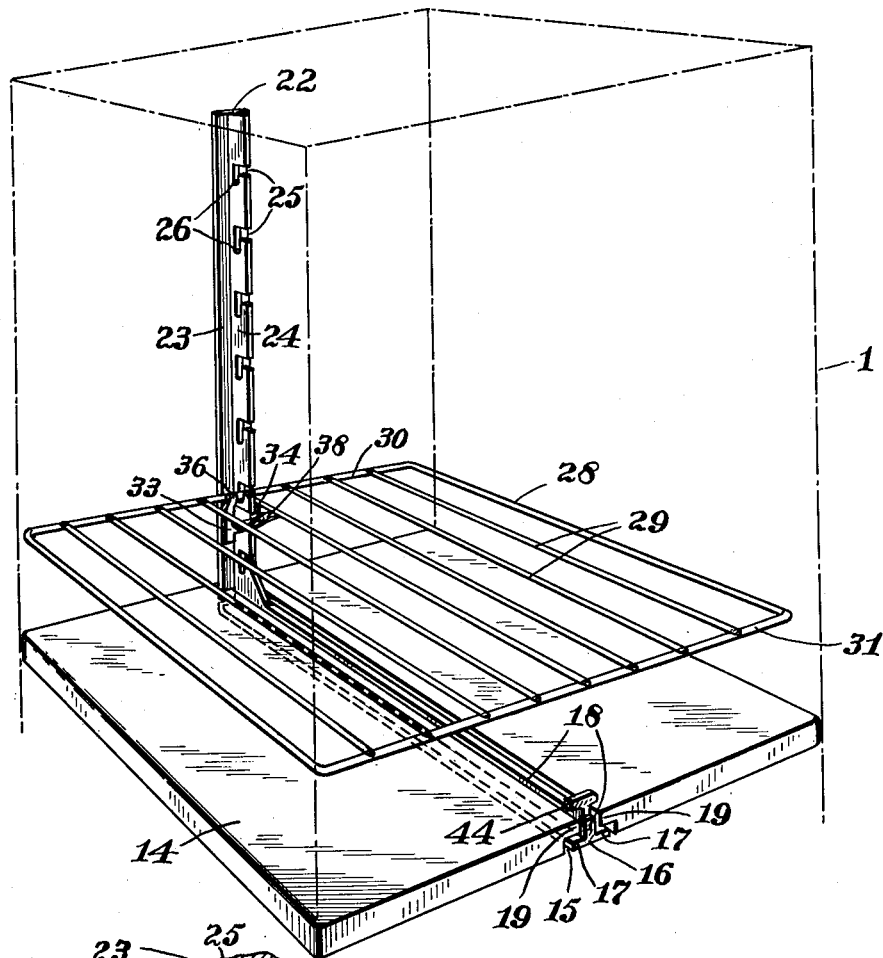
Fig. 2 is a detail view of the bottom of the oven, and the rack carrier and racks in perspective; the outline of the oven being indicated in dotted lines.

As shown in Fig. 2, the floor 14 is provided with a central groove 15, in which is slidably mounted a bar 16 preferably of inverted T-shape, and comprising a head having lateral flanges 17 and a perpendicular flange 18, the lateral flanges lying beneath complemental flanges 19 which parallel and form the sides of the central groove, while the perpendicular flange lies within said groove. Adjacent its rear end, the bar is provided with a pair of anti-friction rollers 20 which take under the flanges paralleling the central groove, while journaled suitably in the walls forming the groove, at its forward end, are another pair of anti-friction rollers 21 upon which the bar rides during its sliding movements into and out of the oven.

The bar 16 is provided at its rear end with an upright or perpendicular rack supporting post 22, preferably formed as an integral part of the bar 16, as by casting, although said bar and post may be formed as separate members suitably secured together. The construction is such however, that the bar 16 rigidly supports the rack post.

The rack supporting post 22 comprises a T-shaped member from the head 23 of which extends a flange 24 provided with a vertical series of notches 25, each terminating at its inner end, in a downwardly extending angular cut-away recessed portion 26, which latter serves to receive a portion of the rack 28 now to be described.

The rack 28 comprises a rectangular frame including longitudinal strips 29 preferably welded at their ends to the transverse bars 30 and 31 respectively of said frame, and in general quite similar to those racks commonly in use today.

We have, however, provided a construction in which the racks are supported by and moved with the sliding bar 16 and post 22, as distinguished from the usual structure in which the several racks are mounted upon fixed supporting hooks, pins or the like secured on the walls of the oven. To this end, the rear transverse bar 30 is provided substantially midway its length, with a bracket designated generally by the numeral 33, said bracket comprising a yoke 34, which in use is adapted to straddle the forwardly extending flange 24 of the post.

Figure 4:
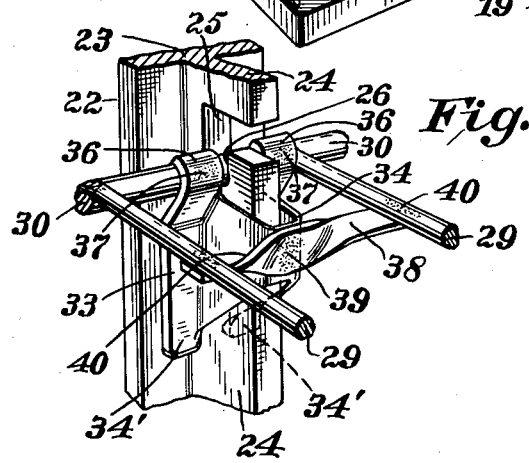
Fig. 4 is an enlarged perspective detail view of a portion of the rack carrier and one of the racks, and showing clearly the manner of mounting the latter.

The yoke 34 is provided with a pair of lateral flanges 34', terminating at their upper ends in hooked portions 36 which are preferably spot-welded as at 37 to the rear bar 30, as clearly shown in Figure 4. The yoke 34 is provided with a horizontal brace bar 38, preferably spot-welded intermediate its length to the crown of the yoke as at 39, the ends of said brace bar being also preferably spot-welded as at 40 to immediately adjacent longitudinal strips 29 upon each side of the yoke respectively.

The weight of the rack alone, or the added weight of any article placed thereon causes the lateral flanges to rest against the flanges of the head of the post 22, while the rear bar 30 rests in and is restrained against the forward wall of the cut-away portion 26. It will thus be observed that the rack may be supported entirely through the bracket 33, yet capable of ready removal from the post for vertical adjustment or otherwise by simply lifting the yoke of the bracket out of the notch which it occupies.

When an additional support for the racks may be necessary, we may provide the inner lining plates 41 of the side walls with a vertical series of supporting hooks or pins 42, arranged at points of elevation similar to that of the notches in the rack supporting post 22. By this arrangement, the racks will have a forward as well as rear support, the hooks or pins serving as supports for the racks along the side members thereof during sliding movement of the bar 16 and its associated rack carrying post 22.

For the purpose of moving the rack carrier into and out of the oven on its anti-friction bearings, we provide the outer extremity of the slidable bar 16 with a finger piece or "pull" 44, shown more particularly in Figure 2.

What we claim as new and desire to secure by Letters Patent is:

1. In a rack supporting means for cooking apparatus, a vertical support having rear flanges and a flange extending perpendicular thereto and provided with a notch, a rack having a supporting bar adapted to rest in said notch, and a yoke carried by said bar adapted to straddle said perpendicular flange and rest against said rear flanges.

2. In a rack supporting means for cooking apparatus, a vertical support having rear flanges and a flange extending perpendicular thereto and provided with a notch, a rack having a supporting bar adapted to rest in said notch, and a yoke carried by said bar having side members adapted to rest against the rear flanges, and a portion adapted to straddle said perpendicular flange.

3. In a rack supporting means for cooking apparatus, a vertical support having rear flanges and a flange extending perpendicularly thereto and provided with a notch, a rack having a supporting bar adapted to rest in said notch, and a yoke carried by said bar and adapted to rest against said rear flanges.

4. In a rack supporting means for a cooking stove oven, a vertical support having a rear flange and having a plurality of hooks on the front face thereof, a rack having a supporting member cooperating with either of said hooks, and a yoke carried by said supporting member having side members adapted to rest against said rear flange.

JACOB TELLER.
ARTHUR P. SCHULZ.